(12) United States Patent
Van Tooren

(10) Patent No.: US 11,001,008 B2
(45) Date of Patent: May 11, 2021

(54) WELDING HEAD AND METHOD FOR USE WITH POLYMERIC COMPONENTS

(71) Applicant: UNIVERSITY OF SOUTH CAROLINA, COLUMBIA, SC (US)

(72) Inventor: Michael Van Tooren, Columbia, SC (US)

(73) Assignee: University of South Carolina, Columbia, SC (US)

( * ) Notice: Subject to any disclaimer, the term of this patent is extended or adjusted under 35 U.S.C. 154(b) by 72 days.

(21) Appl. No.: 16/306,034

(22) PCT Filed: Jun. 2, 2017

(86) PCT No.: PCT/US2017/035587
§ 371 (c)(1),
(2) Date: Nov. 30, 2018

(87) PCT Pub. No.: WO2017/210504
PCT Pub. Date: Dec. 7, 2017

(65) Prior Publication Data
US 2019/0134918 A1    May 9, 2019

Related U.S. Application Data

(60) Provisional application No. 62/345,065, filed on Jun. 3, 2016.

(51) Int. Cl.
*B32B 7/00* (2019.01)
*B29C 65/06* (2006.01)
(Continued)

(52) U.S. Cl.
CPC .......... *B29C 65/0681* (2013.01); *B29C 65/08* (2013.01); *B29C 65/10* (2013.01);
(Continued)

(58) Field of Classification Search
USPC ....................................................... 156/73.5
See application file for complete search history.

(56) References Cited

U.S. PATENT DOCUMENTS

| 5,460,317 A | 10/1995 | Thomas et al. |
| 6,811,631 B2 | 11/2004 | Moglich |

(Continued)

FOREIGN PATENT DOCUMENTS

| WO | WO 2004/085141 | 10/2004 |
| WO | WO 2012/064194 | 5/2012 |
| WO | WO 2017/035313 | 3/2017 |

OTHER PUBLICATIONS

Ageorges, et al. "Fusion Bonding of Polymer Composites" Springer-Verlag (2002).
(Continued)

*Primary Examiner* — James D Sells
(74) *Attorney, Agent, or Firm* — Dority & Manning, P.A.

(57) ABSTRACT

A fusion bonding process for polymeric components and welding heads for use in the process are described. Methods and devices can be utilized to weld polymer-based structural components to one another by use of an enhanced friction stir welding technology that combines heating, pressure, and polymer agitation to form a highly secure joint between polymeric structural components and a short fiber reinforced thermoplastic connection element.

17 Claims, 2 Drawing Sheets

(51) Int. Cl.
- B29C 65/08 (2006.01)
- B29C 65/16 (2006.01)
- B29C 65/72 (2006.01)
- B29C 65/24 (2006.01)
- B29C 65/32 (2006.01)
- B29C 65/18 (2006.01)
- B29C 65/00 (2006.01)
- B29C 65/50 (2006.01)
- B29C 65/14 (2006.01)
- B29C 65/10 (2006.01)
- B29C 65/48 (2006.01)

(52) U.S. Cl.
CPC ........ B29C 65/106 (2013.01); B29C 65/1412 (2013.01); B29C 65/16 (2013.01); B29C 65/18 (2013.01); B29C 65/242 (2013.01); B29C 65/32 (2013.01); B29C 65/488 (2013.01); B29C 65/5071 (2013.01); B29C 65/72 (2013.01); B29C 66/112 (2013.01); B29C 66/114 (2013.01); B29C 66/43441 (2013.01); B29C 66/73921 (2013.01); B29C 66/81417 (2013.01); B29C 66/8362 (2013.01); B29C 66/863 (2013.01); B29C 66/929 (2013.01); B29C 66/9221 (2013.01); B29C 66/9241 (2013.01); B29C 65/4815 (2013.01)

(56) References Cited

U.S. PATENT DOCUMENTS

| | | | |
|---|---|---|---|
| 6,875,501 | B2 | 4/2005 | Labordus et al. |
| 9,211,674 | B2 | 12/2015 | Van Tooren et al. |
| 9,796,133 | B2 * | 10/2017 | Silvanus ............ B23K 20/1255 |
| 2003/0085257 | A1 | 5/2003 | James et al. |
| 2003/0180693 | A1 | 9/2003 | Mulder et al. |
| 2004/0107019 | A1 | 6/2004 | Keshavmurthy et al. |
| 2004/0151921 | A1 | 8/2004 | Labordus et al. |
| 2006/0177635 | A1 | 8/2006 | Pepe et al. |
| 2007/0107370 | A1 | 5/2007 | Douglas |
| 2008/0173695 | A1 | 7/2008 | Nagao |
| 2009/0098369 | A1 | 4/2009 | Manicke et al. |
| 2010/0323200 | A1 | 12/2010 | Beehag et al. |
| 2014/0220356 | A1 | 8/2014 | Van Tooren |
| 2016/0052194 | A1 * | 2/2016 | Nakai ................ B29C 65/7891 156/73.1 |
| 2017/0044337 | A1 | 2/2017 | Van Tooren et al. |
| 2017/0341301 | A1 | 11/2017 | Van Tooren et al. |
| 2018/0063895 | A1 | 3/2018 | Van Tooren et al. |
| 2018/0141279 | A1 * | 5/2018 | Rousseau ................ B29C 66/41 |

OTHER PUBLICATIONS

Bruck, et al. "Digital Image Correlation Using Newton-Raphson Method of Partial Differential Correction" *Experimental Mechanics* 29(3) (1989) pp. 261-267.

Chu, et al. "Applications of Digital Image Correlation Techniques to Experimental Mechanics" *Experimental Mechanics* 25(3) (1985) pp. 232-245.

Fazzino, et al. "Impedance spectroscopy for progressive damage analysts in woven composites" *Composites Science and Technology* 69(11-12) (2009), pp. 2008-2014.

Giurgiutiu, V. "Structural Health Monitoring with Piezoelectric Wafer Active Sensors—predictive modeling and simulation" *INCAS Bulletin* 2(3) (2010) pp. 31-42.

Giurgiutiu, V. "Structural Health Monitoring with Piezoelectric Wafer Active Sensors" *Elsevier Academic Press* (2008).

Giurgiutiu, V. "Structural Health Monitoring with Piezoelectric Wafer Active Sensors" *ICAST* (2005).

Guo, et al. "A layerwise theory for laminated composites in the framework of isogeometric analysis" *Compos Struct* 107, (2014) pp. 447-457.

Helm, et al. "Improved three-dimensional image correlation for surface displacement measurement" *Optical Engineering* 35(7) (1996) pp. 1911-1920.

La Rocca, et al. "Knowledge-Based Engineering Approach to Support Aircraft Multidisciplinary Design and Optimization" *Journal of Aircraft* 46(6) (2009) pp. 1875-1885.

Luo, et al. "Accurate Measurement of Three-Dimensional Deformations in Deformable and Rigid Bodies Using Computer Vision" *Experimental Mechanics* 33(2) (1993) pp. 123-133. (Abstract only).

Luo, et al. "Application of stereo vision to three-dimensional deformation analyses in fracture experiments" *Optical Engineering* 33(3) (1994) pp. 981-990.

Nagy, et al. "Isogeometric sizing and shape optimization of beam structures" *Comput Methods Appl Mech Eng* 199 (2010) pp. 1216-1230.

Offringa, et al. "Butt-joined, Thermoplastic Stiffened-skin Concept Development" *SAMPE Journal* (2012).

Reifsnider, et al. "Multiphysics Design and Development of Heterogeneous Functional Materials for Renewable Energy Devices: the HeteroFoaM Story" *J. Electrochemical Society* 160 (2013) pp. F470-F481.

Reifsnider, et al. "Material State Changes as a Basis for Prognosis in Aeronautical Structures" *J. Aeronautical Society* 113(1150) (2009) (Abstract only).

Reifsnider, et al. "Durability and Damage Tolerance of Material Systems" John Wiley (2002).

Schut, et al. "Design 'Feasilization' using Knowledge-Based Engineering and Optimization Techniques" *Journal of Aircraft* 44(6) (2007) pp. 1776-1786. (Abstract only).

Steenhuizen, et al. "The implementation of a Knowledge-Based framework for the aerodynamic optimization of a morphing wing device" *Advanced Engineering Informatics* 26(2) (2012) pp. 207-218.

Sutton, et al. "Image Correlation for Shape, Motion and Deformation Measurements" Springer (2009).

Sutton, et al. "Effects of Subpixel Image Restoration on Digital Correlation Error Estimates" *Optical Engineering* 27(10) (1988) pp. 870-877.

Sutton, et al. "Determination of Displacements Using an Improved Digital Correlation Method" *Image and Vision Computing* 1(3) (1983) pp. 1333-1339. (Abstract only).

Van Der Laan, et al. "Integration of friction stir welding into a milti-disciplinary aerospace design framework" *Aeronautical Journal* 110(1113) (2006) pp. 759-766. (Abstract only).

Van Ingen, et al. "Development of the Gulfstream G650 Induction Welded Thermoplastic Elevators and Rudder" *SAMPE International Conference & Exhibition* (2010).

Van Tooren, et al. "Composite materials, composite structures, composite systems " *The Aeronautical Journal* 115(1174) (2011) pp. 779-787.

Xing, et al. "Progressive Damage Modeling for Large Deformation Loading of Composite Structures" *Composites Science and Technology* 69 (2009) pp. 780-784.

ISA International Search Report & Written Opinion (PCT/US17/35587), dated Aug. 29, 2017.

* cited by examiner

WELDING HEAD AND METHOD FOR USE WITH POLYMERIC COMPONENTS

CROSS REFERENCE TO RELATED APPLICATION

This application claims filing benefit of U.S. Provisional Patent Application Ser. No. 62/345,065 having a filing date of Jun. 3, 2016, which is incorporated herein by reference in its entirety.

BACKGROUND

Polymers can generally be categorized as either thermoset polymers or thermoplastic polymers. Thermosets include polymers that are highly crosslinked and while they may exhibit some softening upon heating, they cannot be melted and reformed. The lack of recyclability of thermosets is a detraction as is the fact that components formed of thermoset compositions cannot be welded to other materials. However, thermoset components exhibit excellent physical characteristics including temperature and chemical resistance and dimensional stability as well as being very cost effective. Thermoplastic polymers exhibit a melting temperature and as such are capable of welding and recycling. In addition, they can exhibit higher impact resistance than thermosets and can also be highly resistant to chemical degradation. Unfortunately, thermoplastic polymers, particularly thermoplastic engineering polymers, can be quite expensive.

Structures formed of thermoplastic polymer compositions have several advantages over thermoset composites. For instance, joints between thermoplastic parts can be made by relatively simple fusion bonding or welding, creating cohesive joints that are in many ways preferable over the adhesive and mechanical joints used for assembly of thermoset polymer structures. Industrial applications have shown that thin-walled shells formed of thermoplastic compositions can be built effectively using manual lay-up or fiber placement followed by autoclave-based consolidation and joints between skins, spars and ribs of structures can be created effectively using induction welding. However, wider application of welded thermoplastic constructs to practical structural applications is hampered by the cost of the polymers compared with thermoset materials. Moreover, co-consolidation costs (e.g., tooling and equipment), as well as high cost and lead-time for current applied induction welding techniques prevent wider use of thermoplastic compositions in many structural applications.

What are needed in the art are structure formation methods and systems for thermoplastic polymer composites that can decrease costs and time involved in formation. For instance, improved welding methods and devices for use with polymeric compositions would be of great benefit in structural applications. Moreover, methods and materials that could be utilized in forming low cost hybrid thermoset/thermoplastic composites that exhibit the dimensional stability and resistance of thermosets while exhibiting the fusion welding capability of thermoplastics would be of great benefit.

SUMMARY

Aspects and advantages of the invention will be set forth in part in the following description, or may be obvious from the description, or may be learned through practice of the invention.

In one embodiment disclosed herein is a method for joining structural components (e.g., structural panels, ribs, spars, stiffeners, etc.). More specifically, a method can include locating a connection element at a joint in conjunction with a first structural component and a second structural component. The connection element can be formed from a polymeric composition that includes a thermoplastic polymer and short fibers as reinforcement additive. The first and second structural components can include thermoplastic polymers (that can be either the same or different from one another) at a surface of each component that is in contact with the connection element. The method also includes welding the two structural components and the connection element to one another according to a fusion bonding methodology by application of pressure, thermal energy, and rotational energy to the connection element from a welding head. Beneficially, the process can be used to weld the connection element to both structural components in a single fusion step.

Also disclosed is a welding head for use in a fusion bonding process. For instance, the welding head can have a conical tip such that rotational energy imparted to the connection element during a process can fusion bond the connection element securely to two different structural components (both of which being in contact with the connection element) in a single welding step. Moreover, in various embodiments, the welding head can be heated (e.g., inductively heated) and/or can include pressure sensors.

These and other features, aspects and advantages of the present disclosure will become better understood with reference to the following description and appended claims.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

DETAILED DESCRIPTION

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to fusion bonding processes for polymeric components and welding heads for use in the processes. More specifically, disclosed are methods and devices that can be utilized to weld polymer-based structural components to one another by use of an enhanced friction stir welding technology that combines heating, pressure, and polymer agitation to form a highly secure joint between polymeric structural components and a short fiber reinforced thermoplastic connection element.

In one particular embodiment, one or both of the structural components to be joined can be a thermoset/thermoplastic composite structure that can include a thermoplastic polymer at least at those areas at which the joint is formed. However, a thermoset/thermoplastic composite is not limited in such a fashion, and higher relative amounts of thermoplastic polymer can be incorporated in a composite in other embodiments that can take further advantage of the presence of both polymer types in a structural component.

In general, the fusion bonding method includes a combination of friction stir welding and induction welding in creation of a joint between structural components. The fusion bonding method is based on the potential of using a short fiber reinforced thermoplastic profile as a connection element to securely join structural components. Previously, fusion bonded joint formation required an autoclave session to bring the structural parts and any connection element to the melt phase. In the presently disclosed methods, local application of thermal and rotational energy to a short fiber reinforced connection element by use of a properly designed welding head can provide for an effective out-of-autoclave single-step fusion bonding technique. In particular, and without wishing to be bound to any particular theory, it is believed that during the fusion bonding process, the short fibers of the reinforced connection element can bridge the interface between the structural component(s) and the connection element to more securely bond the various elements to one another.

Figure 1:
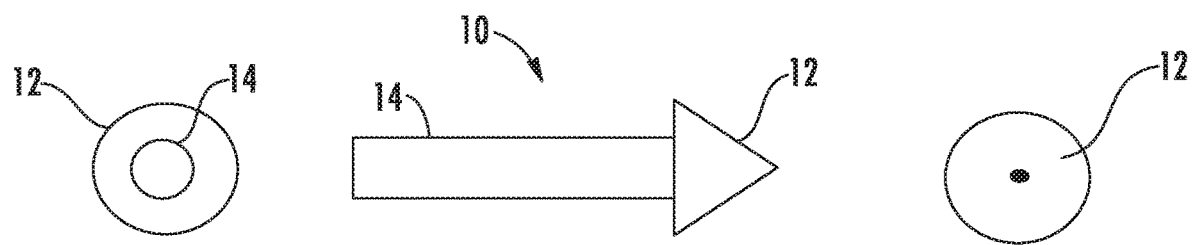
FIG. 1 illustrates one embodiment of a welding head as described herein.

One embodiment of a fusion bonding element (also referred to herein as a welding head) that can provide for the capability of localized heating, pressure and stirring is illustrated in FIG. 1. As shown, a welding head 10 can include a conical tip 12 mounted on a shaft 14. The tip 12 and shaft 14 can be of unitary construction, though this is not a requirement, and can be formed of materials as are generally known in the art, e.g., tool steel.

Typically, the welding head 10 can have a length on the order of several millimeters (mm), for instance from about 3 mm to about 10 mm or about 5 mm in some embodiments. The shaft 14 can be topped with a tip 12 that can have either a flat or pointed tip, with a diameter at the base of the 12 being on the order of several millimeters (e.g. about 5 mm). A pointed tip can be particularly beneficial in those embodiments in which the plates being welded are perpendicular to each other, for instance in forming a blade stiffened plate.

The welding head 10 can be designed for use in conjunction with a controlling tool. During use, the welding head 10 can be mounted in the controlling tool and rotated about the longitudinal axis of the shaft 14 in conjunction with the application of thermal energy and pressure to a connection element.

Figure 2:
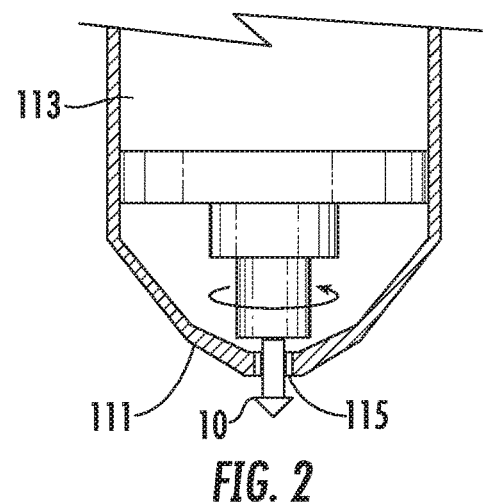
FIG. 2 illustrates a spindle shoulder tool as may be utilized with a welding head as described herein

FIG. 2 illustrates one example of a controlling tool as may be utilized in conjunction with a welding head 10. This particular tool design is referred to as the "spindle shoulder" design and can include a stationary shoulder 111 that is designed to mount onto a spindle sleeve 113 of a mill. The welding head 10 can be passed through a bushing 115 that is pressed into an end of the stationary shoulder 111. The bushing 115 can support the welding head 10 from the loads exerted on it during joint formation. The stationary shoulder 111 can contain melted plastic in the weld area while the welding head 10 stirs the polymer of the connection element and bonds the various components to one another. Of course, the controlling tool is not limited to a spindle shoulder design, and other tool designs as are known in the art can be used including, and without limitation, an aluminum-style tool, a hot-shoe tool, etc.

In one particular embodiment the welding head 10 can be mountable to a robot. For example, a robot can be selected that can deliver and control both pressure and torque of the welding head 10 and optionally also control the locally applied heating during a fusion bonding process. The control strategy can be based on preferred process development that can be developed independently from the robot design. Currently there are commercial options available for robots and robotic heads for friction stir welding of metals. Such robots can be modified as necessary and according to methods as would be known to one of skill in the art for use with polymeric components and according to methods as described herein.

The torque provided to the welding head 10 during a fusion bonding process can provide for the friction stir welding component of the fusion bonding process. The preferred rotational speed of the welding head 10 during a fusion bonding process can vary depending upon, e.g., the polymeric compositions of the components to be bonded to one another and the geometry of the various components, but can generally be from about 500 rpm to about 2000 rpm.

In addition to the rotational energy provided to the joint from a welding head, an appropriate pressure can be applied to the forming joint for consolidation of the polymers of the various components. While the amount of pressure provided can vary depending, for instance, on the size, configuration, and materials of the structural components, in general, the pressure applied during a fusion bonding process can be from about 1 bar to about 20 bar.

The applied pressure can be controlled through localization of one or more pressure sensors. In one embodiment, pressure sensors (e.g., hydraulic pressure sensors) can be provided in the controlling tool and/or on a supporting surface for the structural components. For example, a hydraulic pressure sensor can be mounted in the retaining sleeve of a controlling tool and utilized to control the pressure applied to the connection element. In one embodiment, a pressure sensor can be mounted within/on the welding head itself. This type of sensor can be based on one or more strain gages on or in communication with the welding head that measure strain in the head. These strains can then be converted to force based on a calibration done on the head that relates strains and forces (including torque).

In addition to the application of pressure and rotational energy, thermal energy can also be introduced to a connection element during a fusion bonding process to provide the welding component of the fusion bonding process. Thermal energy can be introduced during the bonding process by heating one or more of the welding head, the connection element, and the structural parts to be welded by use of a secondary heating source or through indirect heating of the welding head. For instance, the welding head 10 can be inductively heated and can directly provide thermal energy to the connection element during the fusion bond formation process. In one embodiment, the welding head 10 can be heated via frictional heating between a rotating component (e.g., the shaft 14 of the welding head) and a contacting surface of the controlling tool (e.g., the bushing 115 of the controlling tool). The method of heating the local area of the weld is not limited to direct or indirect heating of the welding head, however, and in other embodiments thermal energy can be provided to the local area by heating the connection element by use of a secondary heating source, e.g., an applied heated shoe, a sonic generator, an infrared based heating system, a laser, heating the local area by use of a heat transfer fluid or flame, etc.

Figure 3:
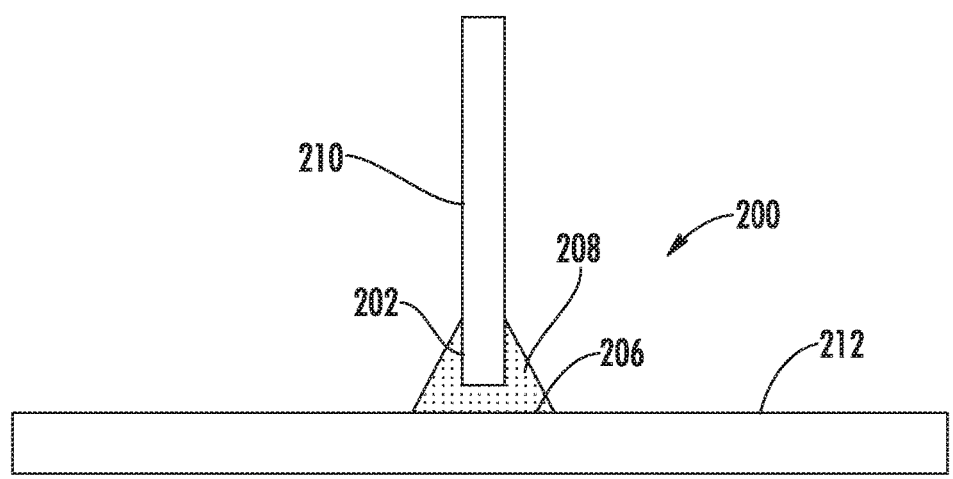
FIG. 3 illustrates one embodiment of a composite structure that includes a first structural component, a second structural component, and a connection element forming a joint as may be welded according to disclosed methods.

The fusion bonding process can be utilized to form a structural joint between a connection element and two or more structural components. FIG. 3 presents a cross-sectional view of one embodiment of a structural joint 200 that may be formed according to the process. As shown, a structural joint 200 can be formed between a first structural component 210 and a second structural component 212 by use of a connection element 208. In forming the joint 200, an intimate connection can be created by combination of local heating of surface portions 202, 206 of the structural components 210, 212 and of the connection element 208 in combination with an appropriate pressure force and forced mixing of thermoplastic polymers in the structural components 210, 212 with polymer(s) of the connection element 208.

Figure 4:
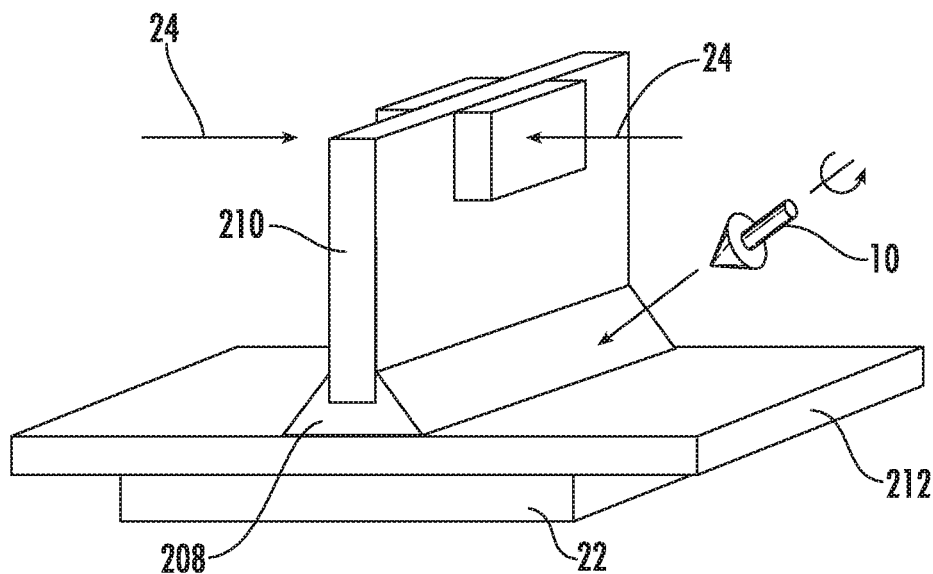
FIG. 4 illustrates one welding method as described herein.
Figure 5:
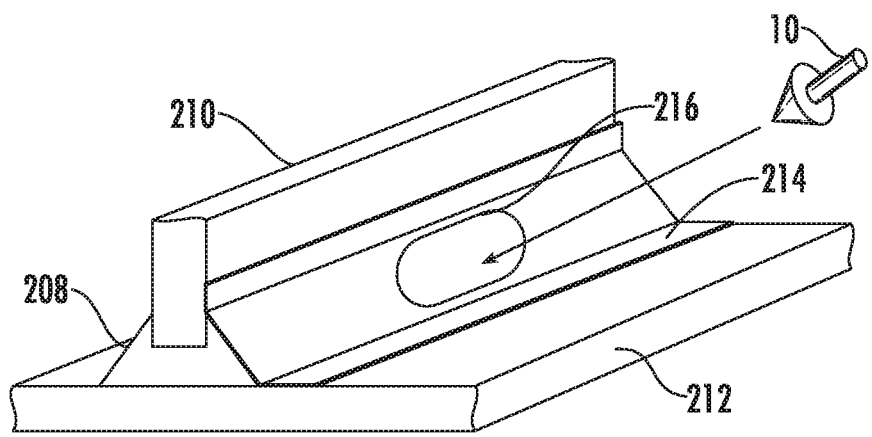
FIG. 5 illustrates another welding method as described herein.

FIG. 4 and FIG. 5 illustrate methods of carrying out the fusion bonding method. As can be seen, a welding head 10 can be applied to a connection element 208. The connection element 208 can be in contact with surfaces of structural component 210 and structural component 212. The structural components 210, 212, can be supported (as at 22) and clamped (as at 24) as necessary to be held in the desired orientation to one another. For instance, though illustrated in the embodiments of FIG. 4 and FIG. 5 as essentially perpendicular to one another, it should be understood that any orientation between the structural components is encompassed herein. In one embodiment, the welding head 10 can be contacted with the connection element 208 such that it is equi-distant from the structural components 210, 212. For instance, when considering perpendicular structural components 210, 212, the welding head 10 can contact the connection element 208 such that the axis of the welding head 10 is approximately 45° from the surface of each structural component 210, 212.

Upon application of the welding head 10 to the connection element 208, the rotational energy provided from the spinning of the welding head 10 can combine with thermal energy and pressure to stir the thermoplastic polymer of the connection element 208 and intermingle and consolidate thermoplastic polymer at the contacting surfaces of the structural components 210, 212 with the connection element 208. As discussed above, the thermal energy can be provided either directly from the welding head 10 or indirectly. For example, in the embodiment of FIG. 4, the welding head 10 can be heated (e.g., inductively heated or friction heated) to provide the thermal energy directly in conjunction with the rotational energy and the pressure. In the embodiment of FIG. 5, a heating shoe 214 is included that can be located adjacent to the connection element 208 to provide thermal energy to the connection element. As shown, the heating shoe 214 can include an aperture 216 through which the welding head 10 can contact the connection element 208. To form the joint, the welding head 10 can be moved laterally down the length of the connection element 208 (optionally in conjunction with motion of any external heating mechanism such as the heating shoe 204) thereby fusion bonding the multiple components to one another.

The fusion bonding method can meet the necessary requirements for formation of an effective joint including 1) an intimate and continuous connection between the two structural components 210, 212 and 2) a proper fillet formed by the connection element 208 at the joined surfaces of the two structural components 210, 212.

The connection element 208 can be a polymeric profile formed of a polymeric composition that includes one or more thermoplastic polymers and short fiber reinforcement additive. While a polymeric composition can include any thermoplastic polymer or combination thereof, in one embodiment, the polymeric composition can include a high performance thermoplastic polymer that can exhibit high mechanical properties such as stiffness, toughness, and low creep that make them valuable in the manufacture of structural products like gears, bearings, electronic devices, and vehicle parts (e.g., automobile and/or other transportation applications such as aircraft and aerospace shell structures). A high performance thermoplastic polymer is generally substantially amorphous or semi-crystalline in nature and has a relatively high glass transition temperature. For example, the glass transition temperature of a high performance thermoplastic polymer can be about 100° C. or more, in some embodiments about 110° C. or more, in some embodiments from about 120° C. to about 260° C., and in some embodiments, from about 130° C. to about 230° C. The glass transition temperature may be determined as is well known in the art using differential scanning calorimetry ("DSC"), such as determined by ISO Test No. 11357. Exemplary high performance polymers can include, without limitation, amorphous thermoplastics such as polysulfone (PSU), poly(ethersulfone) (PES), and polyetherimide (PEI); imidized materials such as polyimide (PI), polyamide-imide (PAI), and polybenzimidazole (PBI); as well as semi-crystalline thermoplastics such as poly(phenylene sulfide) (PPS), polyaryl ether ketones (PAEK) including polyether ketones (PEK) and polyetheretherketone (PEEK), partly aromatic polyamides such as polyphthalamide (PPA), liquid-crystalline polymers (LCP), and polyphenylene sulfones (PPSU) as well as blends and copolymers of high performance polymers.

The connection element can be formed of a polymeric composition that includes a short fiber additive in conjunction with a thermoplastic polymer. The short fibers of the additive can include one or more fiber types including, without limitation, polymer fibers, glass fibers, carbon fibers, metal fibers, natural fibers such as jute, bamboo, etc., basalt fibers, and so forth, or a combination of fiber types.

The fiber sizes can vary as is known in the art. As utilized herein, the term "short fiber" generally refers to fibers that have an initial length (i.e., the length of the fibers as added to the polymeric composition) of about 5 mm or less, for instance from about 3 mm to about 5 mm. Fiber diameters can vary depending upon the particular fiber used. The short fibers, for instance, can have a diameter of less than about 100 μm, such as less than about 50 μm. For instance, the fibers can have a fiber diameter of from about 5 μm to about 50 μm, such as from about 5 μm to about 15 μm.

A polymeric composition can include a short fiber additive in an amount as is generally known in the art such as about 40 wt. % or less. For example, a polymeric composition can include a short fiber additive in an amount of from about 5 wt. % to about 40 wt. %, in some embodiments from about 10 wt. % to about 35 wt. %, and in some embodiments, from about 10 wt. % to about 30 wt. % of the composition.

A polymeric composition can include one or more thermoplastic polymers and a short fiber additive in conjunction with other additives as are generally known in the art including, without limitation, impact modifiers, fillers, antimicrobials, lubricants, pigments or other colorants, antioxidants, stabilizers, surfactants, flow promoters, solid solvents, electrically conductive additives, and other materials added to enhance properties and processability. Such optional materials may be employed in the polymeric composition in conventional amounts and according to conventional processing techniques.

A connection element can be formed according to standard polymeric formation methods as are generally known in the art. For instance, the connection element can be formed according to melt extrusion methods, in which the connection element can be formed according to a predetermined size specification. Following formation, the as-formed connection element can be located at the joint for welding. In another embodiment, a connection element can be formed in-situ at the joint location, for instance according to an additive manufacturing process. Additive manufacturing formation methods as may be utilized in forming a connection element can include any method in which materials of the connection element are deposited according to a controlled, incremental deposition and/or solidification process. For instance, additive manufacturing can refer to 3D printing by use of e.g., extrusion deposition or powder deposition optionally in combination with chemical binding, thermal binding, photopolymerization, etc.

In forming the joint, the connection element can be fusion welded to two or more structural components. Each of the structural components can include a thermoplastic polymer at least at the surface at which the connection element contacts the structural components. For instance, with reference to FIG. 3, the structural components 210, 212 can include a thermoplastic polymer at least at the surfaces 202, 206, respectively, that directly contact the connection element 208.

Polymeric compositions of the structural components can be the same or different from one another and the same or different from the polymeric composition of the connection element. For instance, one or both of the structural components 210, 212 can include a high performance thermoplastic polymer at the joint surface such as those described above.

A polymeric composition of the structural components can include additives as are generally known in the art. In one embodiment, a structural component can include a fibrous additive. In particular embodiments, one or both of the structural components can include a continuous fiber additive, for instance in the form of an impregnated tow. As used herein, the term "tow" can be utilized synonymously with the term "roving" and generally refers to a bundle of individual fibers. The individual fibers contained within the roving can be twisted or can be straight. The number of fibers contained in each roving can be constant or vary from roving to roving. Typically, a roving contains from about 1,000 fibers to about 100,000 individual fibers, and in some embodiments, from about 5,000 to about 50,000 fibers.

A continuous fiber reinforced structural component can be formed according to any suitable formation process. For instance, a continuous fiber reinforced structural component can be formed according to a pultrusion method in which continuous fiber rovings are pulled through a polymeric composition followed by shaping the fiber-reinforced composition within a pultrusion die. Formation of a continuous fiber composite is not limited to a pultrusion method, however, and a continuous fiber composite can be produced by a number of impregnation methods including, without limitation, emulsion, slurry, fiber commingling, film interleaving, and dry powder techniques. In general, a preferred formation method can depend upon the polymer (e.g., thermoplastic, thermoset, or blend) of the composition.

Regardless of the technique employed, when considering a continuous fiber structural component, the continuous fibers are oriented in a predetermined direction of the structural component to enhance tensile strength in the desired direction. Besides fiber orientation, other aspects of the process are also controlled to achieve the desired strength.

One or more of the structural components to be joined according to disclosed methods can be a thermoset/thermoplastic composite structure that includes both a thermoset polymer and a thermoplastic polymer, with the caveat that a thermoplastic polymer is present at least at the weld surface of the structural component. For instance, a structural component can include a polymeric composition that includes a blend of thermoplastic and thermoset polymers. In another embodiment, a structural component can include one or more thermoplastic composition components combined with one or more thermoset composition components to form a thermoplastic/thermoset composite structural component.

Any thermoset polymer suitable for use in structural applications can be incorporated in a structural component including, without limitation, one or more of an epoxide, a polyimide, a bis-maleimide, a polyphenol, a polyester, etc., or combinations thereof that, when fully cured, forms a crosslinked thermoset matrix.

A polymeric composition that includes a thermoset polymer can include additives as are generally known in the art. For instance, curing agents (e.g., diamines), impact modifiers, fillers, dyes, pigments, plasticizers, curing catalysts and other such conventional additives and processing aids may be added to the thermosetting resin compositions described herein before curing to influence the properties of the final resin composite. Additives in a thermoset composition can include thermoplastic materials such as found in toughened epoxies that can incorporated thermoplastic impact modifiers incorporated in the thermoset matrix as well as other additives as are generally known in the art.

A structural component that incorporates a polymeric composition of a thermoplastic/thermoset blend can have a homogenous composition across the structural component or a heterogeneous composition across the structural component, as desired. For example, a heterogeneous structural component can be formed from a polymeric composition that includes a high relative proportion of thermoset polymer (as compared to the concentration of thermoplastic polymer) in the interior of the structural component and a high relative proportion of thermoplastic polymer closer to the surface of the structural component. For instance, the polymeric composition at the surface of the structural component can include little or no thermoset polymer while the polymeric composition within the structural component can include little or no thermoplastic polymer. The transition in thermoplastic/thermoset relative concentration can be gradual over all or a portion of the structural component. For instance, the structural component can define a transition segment within which the ratio of thermoset polymer to thermoplastic polymer varies with a primarily thermoset-containing composition on one side of the transition segment and a primarily thermoplastic-containing composition on an opposite side of the transition segment.

In another embodiment, a structural component can be a composite structure that includes a plurality of elements attached to one another. For instance, a structural component can be a laminate structure that includes one or more layers formed of a polymeric composition that includes thermoplastic polymer(s) as the polymeric matrix component (e.g., continuous fiber reinforced thermoplastic tapes, sheets, etc.) and one or more layers formed of a polymeric composition that includes thermoset polymer(s) as the polymeric matrix component (e.g., continuous fiber reinforced thermoset tapes, sheets, etc.). In this embodiment, the thermoplastic-based layers can be at only an exterior surface of the structural component or alternatively can be interleaved with thermoset layers throughout the structural component.

A polymeric composition of a composite structural component can be or include a thermoset-based composition incorporating a continuous tow. A thermoset-based tow can be formed by impregnating continuous fibers in the form of fiber rovings in a thermoset polymeric composition to form thermoset composite tapes according to fiber placement and fiber steering methods as are known in the art. Briefly, in a fiber placement process, narrow (e.g., about 0.125 in.) resin impregnated tows can be drawn under tension across a tool of the geometry by a computer-controlled head. This head can be capable of delivering up to approximately thirty adjacent resin impregnated tows simultaneously, allowing for high production rates. The narrow tows provide precise control over fiber orientation and, since each tow can be controlled independently, thickness tapers on complex geometry can be readily produced.

A system can provide for adds and cuts (i.e., the start and stop of individual tows) to be controlled by a computer via a CAD interface. For instance, a plurality of feed paths can be employed in a single layer of a composite structure to form a predetermined curve of a final product. In forming a complex shape, the feed rate of each tow can be individually controlled, allowing the longer path of certain tows of a steered radius to feed faster than the shorter path tows.

The ability to support differential tow feed rates combined with the ability to add and drop individual tows provide the opportunity to place fibers along a relatively tight radius with no degradation in component quality. In addition, the capability allows for the interleaving of tows of different polymeric compositions. For instance, a method can be utilized to combine tows including a partially or uncured thermoset composition with tows based on a thermoplastic composition in forming a composite that includes a thermoplastic composition at a weld surface. Tows of different compositions can be combined within an individual layer, as alternating individual layers, in a pattern of layer compositions (e.g., one or more thermoplastic layers between each thermoset layer), or any combination thereof.

Fiber steering is generally carried out by local compaction during placement of the fibers, with each of the impregnated tows having enough tack to overcome any sliding forces. Fiber steering offers potential weight savings by overcoming the restriction of discrete linear fiber orientations commonly associated with traditional composites while the fiber placement process allows tailoring of the composite structure within a ply level by placing composite tows along curvilinear paths. The combined capabilities provide for optimized structural configurations by tailoring fiber paths within a ply to load paths of the component as well as for combining thermoset compositions with the surface modified thermoplastic components.

Of course, fiber placement and fiber steering technologies are not required in formation of a thermoset/thermoplastic composite, and other known methodologies can be utilized. By way of example, a thermoset layer can be combined with a thermoplastic layer according to a hand layup process, an open molding process, a resin infusion process, resin transfer molding (e.g., vacuum-assisted resin transfer molding), reaction injection molding, resin film infusion, compression molding, centrifugal casting, and so forth.

A structural component can include materials in addition to a polymeric composition as is known. For instance, a composite can include metal inserts, a honeycomb core, a foam core, an outer coating, etc.

Disclosed methods and devices can be used in one embodiment in transportation applications. For example, the ability to provide securely joined structural components via a relatively fast and inexpensive welding method can be of great benefit in aerospace and aeronautic applications. For instance, an external skin panel can be directly welded to thermoplastic stiffeners according to automated stiffened shell production and assembly techniques for highly loaded fiber-reinforced, thin walled structures useful in transportation applications, among others.

Among other benefits, the fusion bonding methods and welding heads can be utilized in joining structural components having non-constant thickness. This aspect can be important in making the technology more readily applicable to welding of stiffened panels as may be utilized in a large variety of structural applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include elements that do not differ from the literal language of the claims, or if they include equivalent elements with insubstantial differences from the literal languages of the claims.

What is claimed is:

1. A method for joining structural components comprising:
    locating a connection element at a joint in conjunction with a first structural component and a second structural component, the connection element comprising a polymeric composition that includes a first thermoplastic polymer and a short fiber additive, the first structural component including a second thermoplastic polymer at a surface that upon the locating is in contact with the polymeric composition of the connection element, the second structural component including a third thermoplastic polymer at a surface that upon the locating is in contact with the polymeric composition of the connection element;
    applying pressure and rotational energy to the polymeric composition of the connection element by use of a welding head; and
    applying thermal energy to the connection element, wherein upon application of the pressure, rotational energy and thermal energy, the connection element is simultaneously fusion bonded to the first structural component and the second structural component.

2. The method of claim 1, wherein at least one of the first structural component and the second structural component is a thermoplastic/thermoset composite structure.

3. The method of claim 2, wherein the thermoplastic/thermoset composite structure is a multi-layer laminate structure.

4. The method of claim 1, wherein upon said application of the pressure, rotational energy and thermal energy, short fibers of the short fiber additive of the polymeric composition bridge an interface between the first structural component and the connection element and between the second structural component and the connection element.

5. The method of claim 1 wherein the thermal energy is applied to the connection element by the welding head.

6. The method of claim 1, wherein the thermal energy is applied to the connection element by a secondary heating source.

7. The method of claim 1, wherein the welding head is mountable to a robot.

8. The method of claim 1, further comprising forming the connection element at the joint according to an additive manufacturing process.

9. The method of claim 1, wherein one or more of the first, second and third thermoplastic polymers is a high performance thermoplastic polymer.

10. The method of claim 1, wherein the second thermoplastic polymer and the third thermoplastic polymer are the same polymer.

11. The method of claim 1, wherein the first, second and third thermoplastic polymers are the same polymer.

12. The method according to claim 1, wherein at least one of the second polymeric composition and the third polymeric composition comprises a continuous fiber additive.

13. A welding head for use in a polymeric fusion bonding process comprising a tip mounted on a shaft, the tip comprising a flat or pointed terminal first end and a second end, wherein the second end is attached to the shaft, the terminal first end making initial contact of the welding head with a workpiece during use, the tip further comprising a conical surface extending from the first end to the second end, the second end defining a first circle having a first diameter, the shaft defining an axial diameter that is smaller than the first diameter, the shaft extending from and being centered on the second end of the tip.

14. The welding head of claim 13, wherein the tip and the shaft are of unitary construction.

15. The welding head of claim 13, wherein the welding head is mountable to a robot.

16. The welding head of claim 13, further comprising a pressure sensor.

17. The welding head of claim 13, further comprising a heating mechanism.

* * * * *